US007092123B2

(12) United States Patent
Shiomi

(10) Patent No.: US 7,092,123 B2
(45) Date of Patent: Aug. 15, 2006

(54) EVALUATION OF DOT INTERFERENCE MOIRÉ

(75) Inventor: Junichi Shiomi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 989 days.

(21) Appl. No.: 09/983,633

(22) Filed: Oct. 25, 2001

(65) Prior Publication Data

US 2002/0051261 A1    May 2, 2002

(30) Foreign Application Priority Data

Nov. 2, 2000    (JP)    ............................. 2000-335879

(51) Int. Cl.
G06F 15/00    (2006.01)
H04N 1/46    (2006.01)
G06K 15/00    (2006.01)
G06K 9/40    (2006.01)

(52) U.S. Cl. ........................ 358/1.9; 358/534; 358/536; 358/533; 358/535; 358/3.26; 358/3.27; 358/3.06; 382/264; 382/275

(58) Field of Classification Search .................. 358/1.9, 358/3.26–3.27, 533–535, 536, 3.06, 3.25; 382/264, 275, 375
See application file for complete search history.

(56) References Cited

U.S. PATENT DOCUMENTS 5,513,016 A * 4/1996 Inoue ........................ 358/3.26

FOREIGN PATENT DOCUMENTS

| JP | 8-185505 | 7/1996 |
| JP | 09-238259 | 9/1997 |
| JP | 9-284575 | 10/1997 |
| JP | 10-150572 | 6/1998 |
| JP | 10-222658 | 8/1998 |

* cited by examiner

*Primary Examiner*—Kimberly Williams
*Assistant Examiner*—Charlotte M. Baker
(74) *Attorney, Agent, or Firm*—McDermott Will & Emery LLP

(57) ABSTRACT

A halftone dot image HI composed of halftone dots is produced by halftone dot meshing of an object image OI. A smoothed object image SOI and a smoothed halftone dot image SHI are then produced by smoothing the object image and the halftone dot image. An interference moire image IM is produced by obtaining a difference between the smoothed object image SOI and the smoothed halftone dot image SHI.

18 Claims, 8 Drawing Sheets

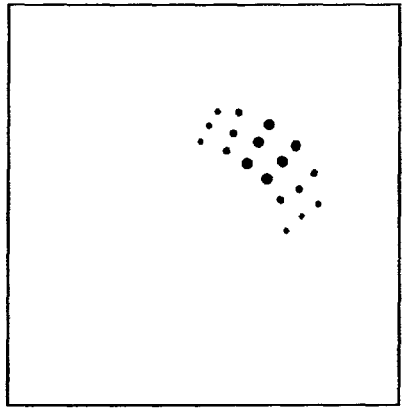
Fig. 4E INTERFERENCE MOIRE IMAGE IM (2400 dpi)
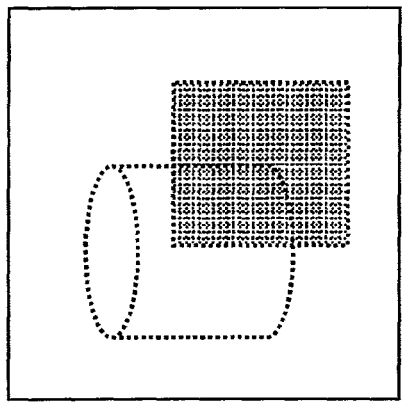
Fig. 4C SMOOTHED OBJECT IMAGE SOI (2400 dpi)
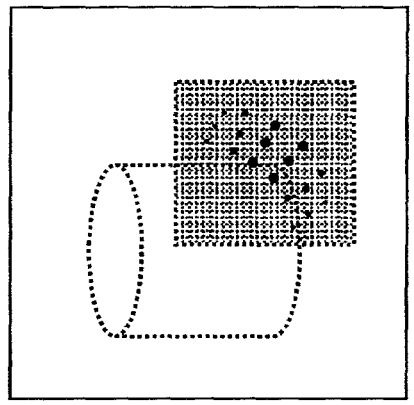
Fig. 4D SMOOTHED HALFTONE DOT IMAGE SHI (2400 dpi)
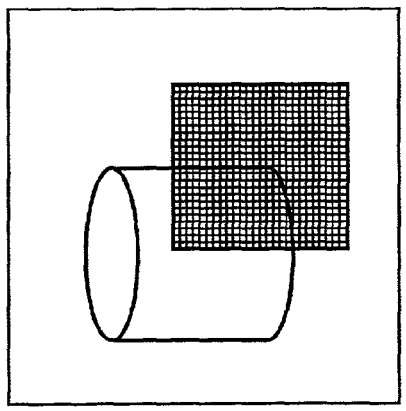
Fig. 4A OBJECT IMAGE OI (2400 dpi)
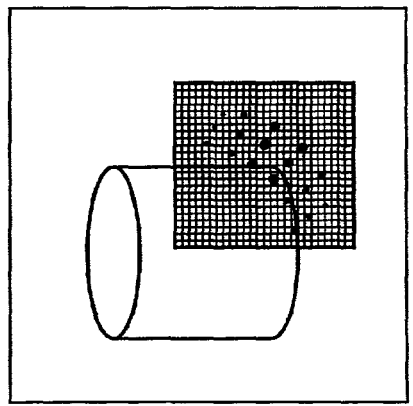
Fig. 4B HALFTONE DOT IMAGE HI (2400 dpi)

LPF COEFFICIENT DISTRIBUTION

HALFTONE DOTS ($\theta = 0°$)

HALFTONE DOTS ($\theta = 45°$)

EVALUATION OF DOT INTERFERENCE MOIRÉ

BACKGROUND OF THE INVENTION

1. Field of the Invention

The present invention relates to a technique for evaluating an interference moiré occurred in a halftone dot image.

2. Description of the Related Art

A proof of a halftone dot image is usually made before the final printing. Proofs are conventionally made with a dedicated proof printer using halftone dots. Recently non-dot hard proof is available where images are printed by means of an inexpensive color printer without using halftone dots, and soft proof is also available where a proof image is displayed on a display device.

FIGS. 8A and 8B depict typical square halftone dots used for printing. The halftone dots have a periodic structure defined by a halftone dot pitch Pd and a screen angle θ. As used herein, the term "halftone dot" will refer to a dot in such a cyclic pattern.

In some cases, a target image to be printed contains cyclic patterns such as striped patterns or meshed patterns. When the target image is printed as a halftone dot image, interference occurs between the pattern cycle within the original target image and the cycle of the halftone dot structure, yielding a pattern that is absent from the original target image. The pattern caused by the interference is referred to as an "interference moiré".

The aforementioned non-dot hard proofs and soft proofs are advantageous in that they are inexpensive and involve simpler proofing procedures because there is no need to use dedicated proof printers. However, such non-dot hard proofs and soft proofs are still disadvantageous in that an interference moiré cannot be detected because no halftone dots are used.

SUMMARY OF THE INVENTION

Accordingly, an object of the present invention is to provide a technique whereby an interference moiré that is apt to occur during printing is evaluated without using halftone dots to make a proof.

In order to attain at least part of the above and related object of the present invention, there is provided a method for evaluating an interference moiré that is likely to be occurred in a halftone dot image when the object image is printed using halftone dots. In this method, halftone dot meshing is first performed on object image data representing the object image to produce halftone dot image data representing a halftone dot image composed of halftone dots. Then both the object image data and the halftone dot image data are smoothed to produce smoothed object image data and smoothed halftone dot image data. An interference moiré image data representing an interference moire image is produced by obtaining a difference between the smoothed object image data and the smoothed halftone dot image data.

A halftone dot image includes an original image component (object image component), a halftone dot frequency component, and an interference moiré component. Since the halftone dot frequency component has high frequency, smoothing a halftone dot image will yield a smoothed halftone dot image such that it contains the original image component (object image component) and the interference moiré component but is substantially devoid of the halftone dot frequency component. An interference moiré image can therefore be extracted by finding the difference between the smoothed halftone dot image and the smoothed object image. Using this interference moiré image allows evaluation of an interference moiré without making a proof with halftone dots.

The present invention can be implemented in a variety of configurations, for example, as a method or an apparatus for evaluating an interference moiré, a computer program for performing the functions of such a method or apparatus, a computer readable medium for storing such a computer program, and a data signal embodied in a carrier wave containing this computer program.

These and other objects, features, aspects, and advantages of the present invention will become more apparent from the following detailed description of the preferred embodiments with the accompanying drawings.

BRIEF DESCRIPTION OF THE DRAWINGS

FIGS. 4A–4E are diagrams depicting the specifics of the interference moiré extraction routine;

DESCRIPTION OF THE PREFERRED EMBODIMENT

A. First Embodiment

Figure 1:
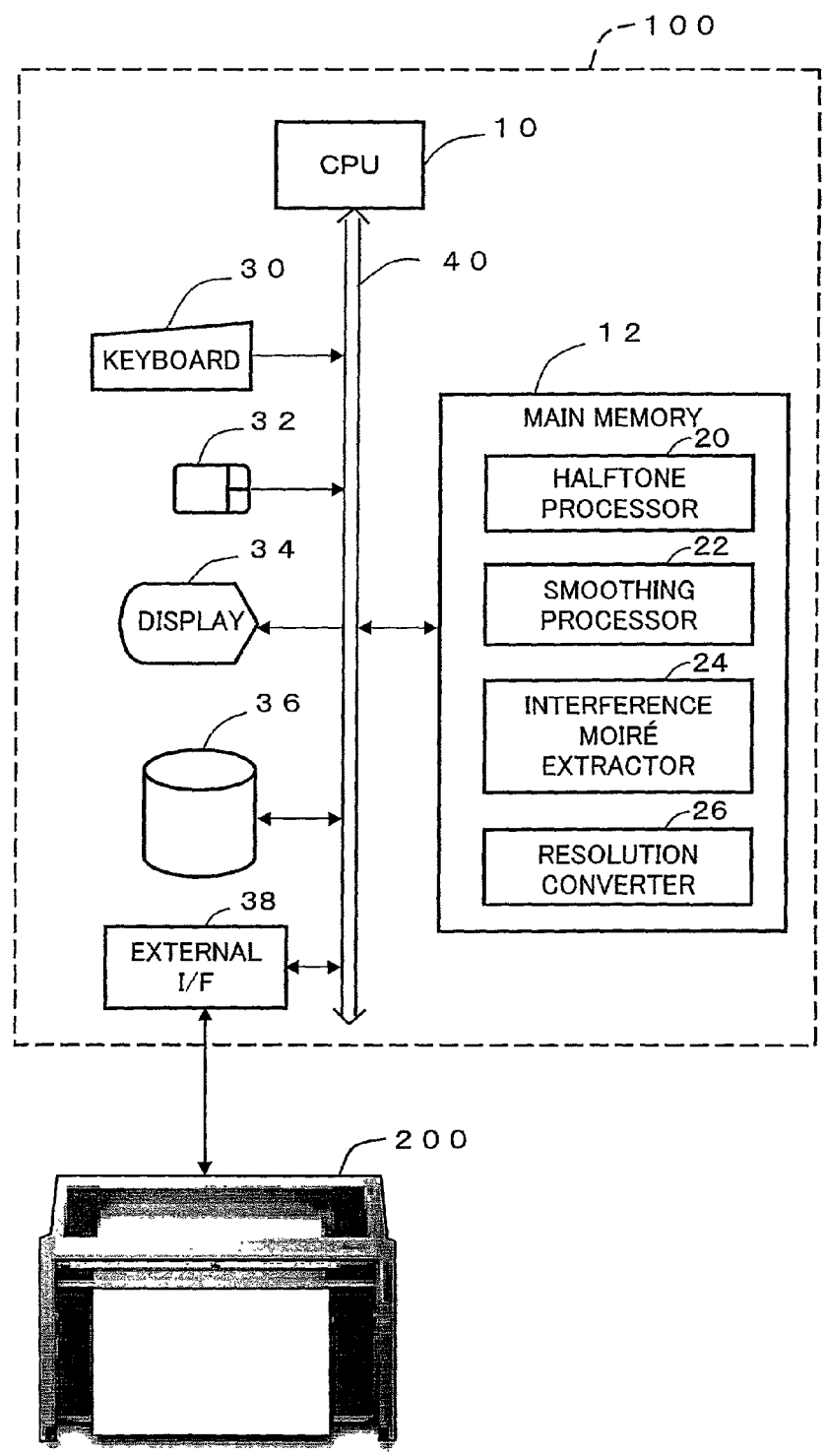
FIG. 1 is a block diagram depicting the structure of an image processing system as an embodiment of the present invention.

FIG. 1 is a block diagram depicting the structure of an image processing system as an embodiment of the present invention. The image processing system comprises a computer 100 and a printer 200.

The computer 100 comprises a CPU 10, a main memory 12 containing a ROM and a RAM, a keyboard 30, a mouse 32, a display device 34, a hard disk 36, an external interface 38, and a bus 40 for connecting these elements together.

The printer 200 is connected to the external interface 38 of the computer 100. The printer 200 is a non-dot color printer for printing images without the use of halftone dots. Examples of such color printers include ink-jet printers, thermal printers, laser printers, and various other printers. It should be noted that the "non-dot color printer" does not use halftone dots but it may use small ink dots or spots. The term "halftone dot" refers to an aggregation of one or more small dots and whose area, or the number of constituent small dots, is changed to represent a tone level of the image.

The main memory 12 of the computer 100 contains computer programs for performing the functions of a halftone processor 20, a smoothing processor 22, an interference moiré extractor 24, and a resolution converter 26. The main memory 12 temporarily stores various types of image data used in interference moiré extraction processing described below. The functions of the processors 20, 22, 24, and 26 will be described below. The computer programs for performing the functions of the processors 20, 22, 24, and 26 are stored on the hard disk 36 (storage medium) and are loaded to the main memory 12 before being executed by the CPU 10.

Figure 2:
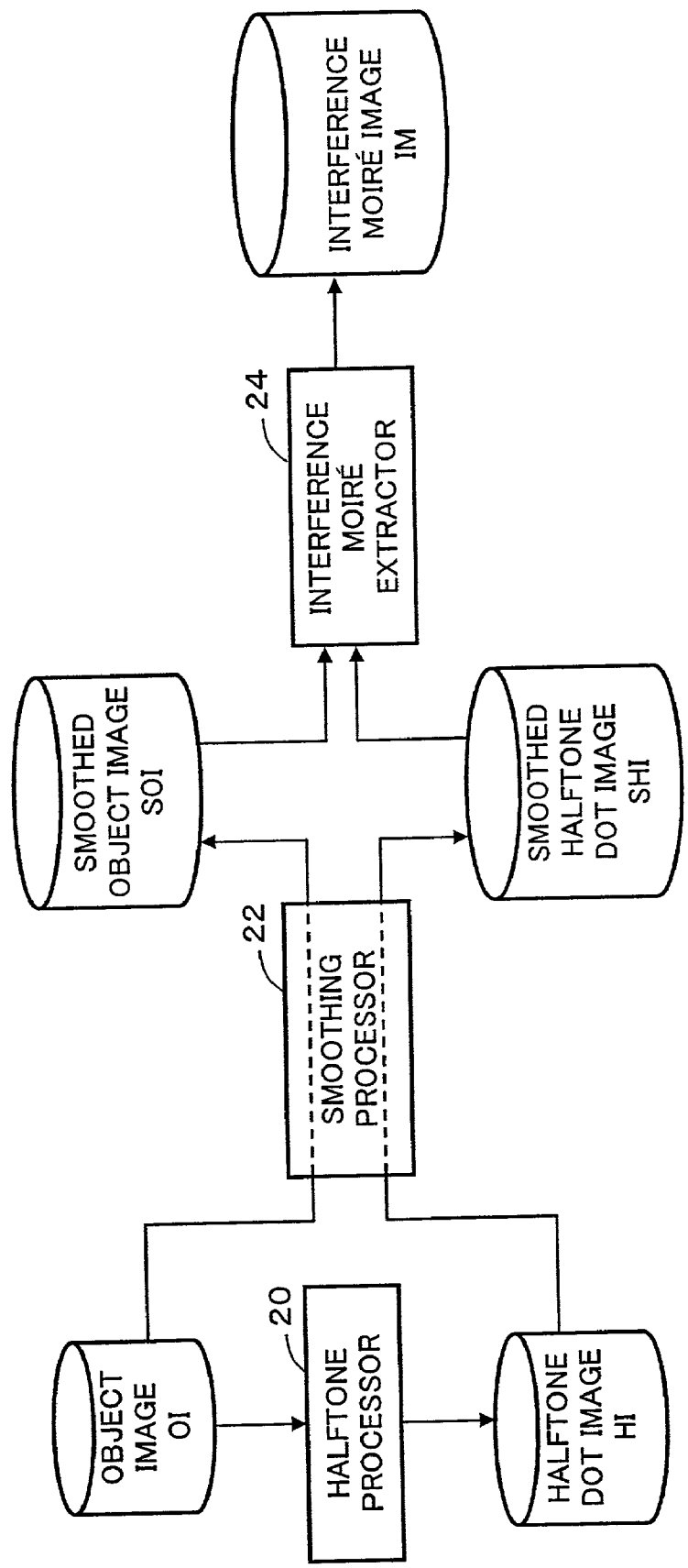
FIG. 2 is a diagram depicting the flow of an interference moiré extraction routine.
Figure 3:
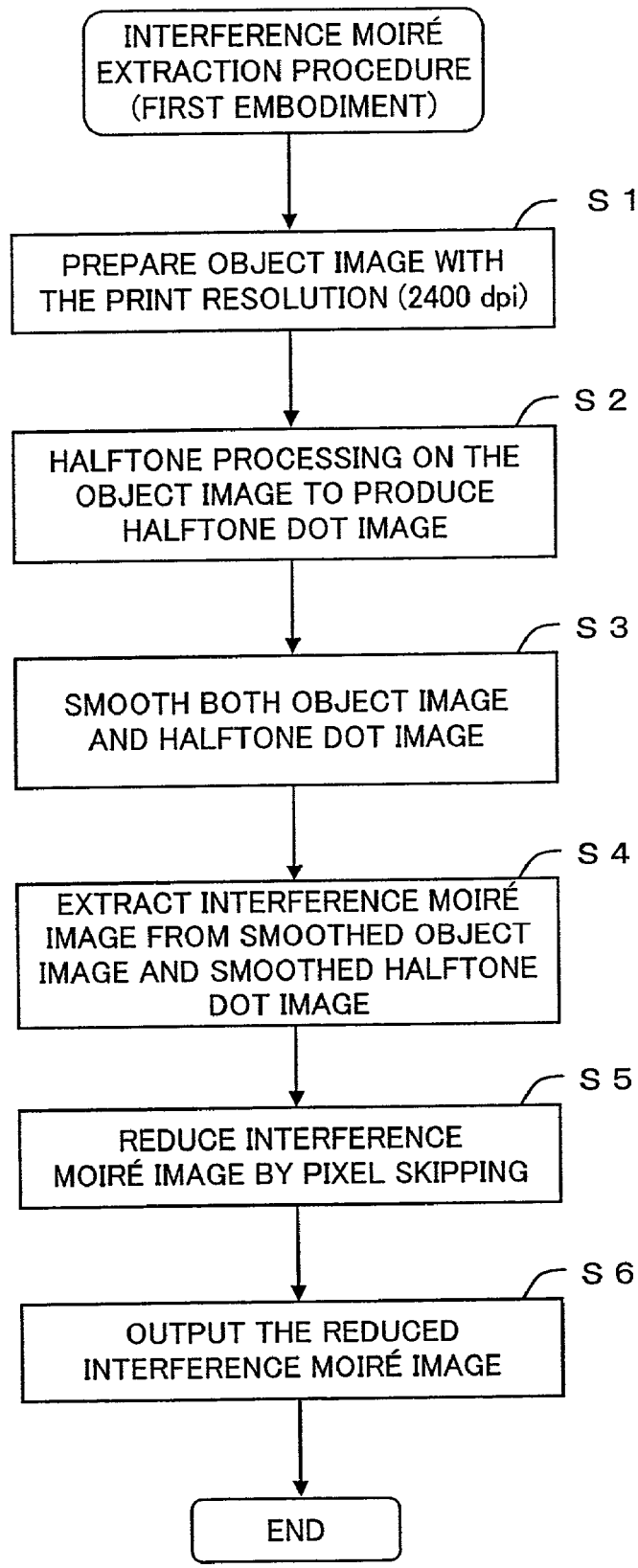
FIG. 3 is a flowchart of the interference moiré extraction routine performed in accordance with the first embodiment.

FIG. 2 shows the relationship among the processors, and FIG. 3 is a flowchart of the interference moiré extraction routine performed in accordance with the first embodiment. Unless indicated to the contrary, the term "image" will have a dual meaning and will refer either to an image as such or to image data representing this image.

In step S1 in FIG. 3, the resolution converter 26 operates such that an object image OI (FIG. 2) whose resolution is equal to the print resolution is prepared based on the original image to be printed. The original image to be printed is a multi-tone color image whose resolution is usually about several times lower than the print resolution. In this embodiment, it is assumed that the resolution of the original image is 400 dpi and that the print resolution is 2400 dpi. In this case, the resolution converter 26 converts the resolution of the original 400-dpi image to produce a 2400-dpi object image OI. This resolution conversion can be achieved by simple pixel padding. Specifically, an object image OI with a resolution of 2400 dpi can be obtained by substituting each pixel of the original 400-dpi image with 6×6 pixels.

FIG. 4A depicts an example of an object image OI. The object image contains a meshed image portion. An interference moiré tends to form in such a meshed image portion when the object image OI is reproduced with halftone dots.

The image data of an object image OI contain multiple color components of color-separated image data corresponding to the inks to be used for printing. For example, the object image data contain four color components Y, M, C, K of color-separated image data when an image is printed by a printer with four ink colors of Y (Yellow), M (Magenta), C (Cyan), and K (blacK). The routines that follow step S2 in the description given below are therefore performed for each color component of color-separated image data.

In step S2, the halftone processor 20 produces a halftone dot image HI (FIG. 2) by halftone dot meshing of the object image OI. As used herein, the term "halftone dot meshing" refers to a process in which a halftone dot image is obtained using halftone dots from an arbitrary image. The halftone dot image HI has the same resolution as the object image OI.

FIG. 4B shows the halftone dot image HI. The halftone dot image HI includes the following three image components.

(1) Original image component
(2) Halftone dot frequency component
(3) Interference moiré component As used herein, the term "original image component" refers to an image component present in the original image (in the case under consideration, the object image OI). The term "halftone dot frequency component" refers to an image component corresponding to a frequency of the halftone dot arrangement. The term "interference moiré component" refers to an image component produced by interference between the periodicity of halftone dots and the periodicity of the cyclic pattern within the object image. FIG. 4B depicts the manner in which the interference moiré component appears on the image portion of the mesh in the halftone dot image HI. The procedures that follow step S3 in accordance with the description given below are designed to extract solely the interference moiré component from the halftone dot image HI.

In step S3, the smoothing processor 22 smoothes both of the object image OI and the halftone dot image HI (FIG. 2). FIGS. 4C and 4D depict the smoothed object image SOI and the smoothed halftone dot image SHI thus obtained.

The halftone dot image HI is smoothed in order to remove the halftone dot frequency component from the three components described above. Specifically, the halftone dot frequency component has a higher frequency than the interference moiré component. In view of this, smoothing the halftone dot image HI makes it possible to remove the halftone dot frequency component while retaining the interference moiré component.

Figure 5A:
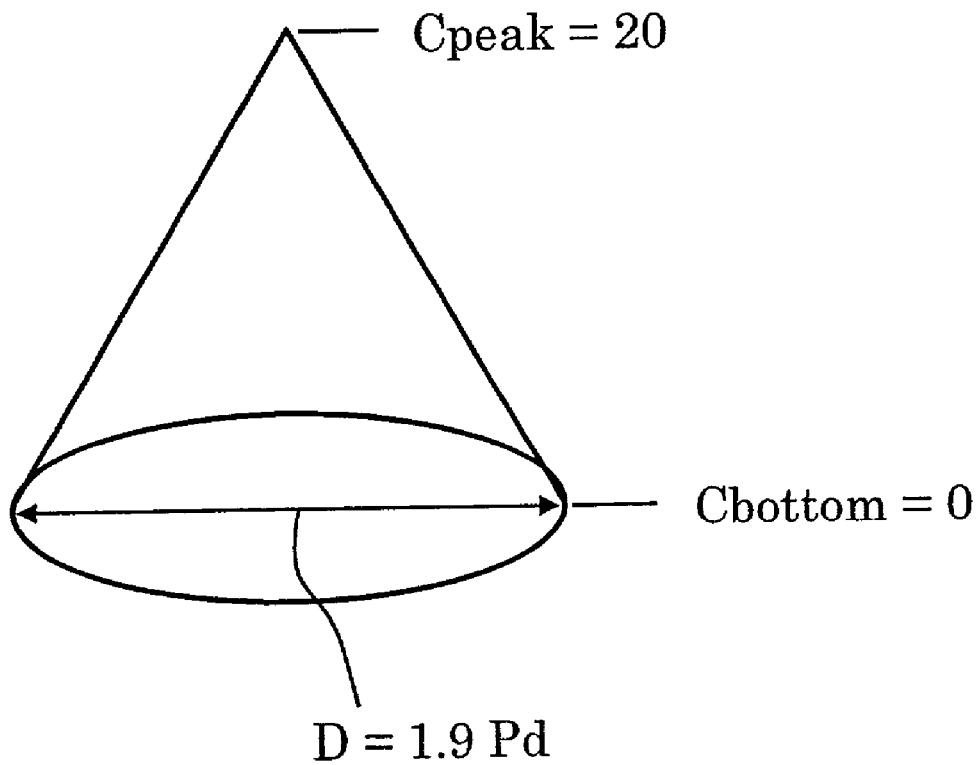
FIGS. 5A and 5B are diagrams depicting a low-pass filter used for smoothing.
Figure 5B:
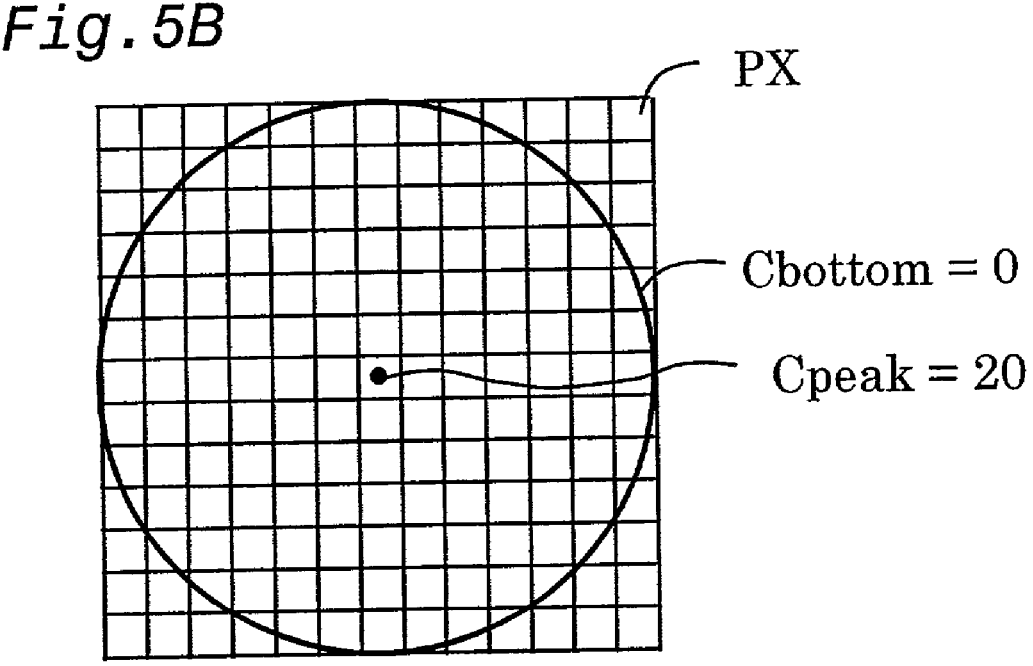
Figure 8A:
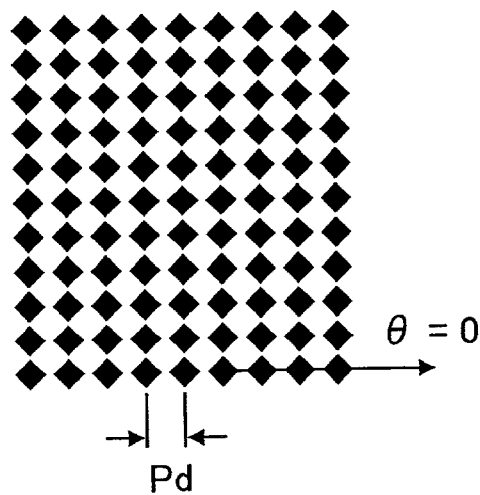
FIGS. 8A and 8B are diagrams depicting halftone dots.
Figure 8B:
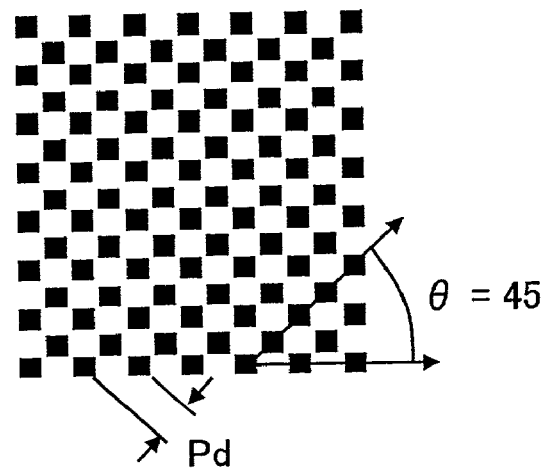

A low-pass filter (LPF) may be used for such smoothing. FIGS. 5A and 5B are diagrams depicting the low-pass filter used for smoothing in accordance with the present embodiment. The low-pass filter has a conical coefficient distribution, as shown in FIG. 5A. FIG. 5B depicts the planar distribution of the filter. The small squares shown in FIG. 5B correspond to pixels PX. The coefficient $C_{peak}$ of the pixel in the center of the filter is about 20, and the coefficient $C_{bottom}$ on the circumference of the filter is zero. The coefficient of a pixel inside the filter circumference can be obtained by the linear extrapolation of the coefficient $C_{peak}$ (=20) for the center pixel and the coefficient $C_{bottom}$ (=0) for the circumference. The diameter D of the filter should preferably be set to about 1.9 times the halftone dot pitch Pd (FIG. 8).

A smoothing filter different from the one shown in FIGS. 5A and 5B can also be used as the low-pass filter for smoothing. The preferred coefficient distribution of the smoothing filter may be appropriately set in accordance with the resolution of the object image OI, and the halftone dot pitch Pd of the halftone dot image HI.

The halftone dot frequency component can be removed from the halftone dot image HI by smoothing the halftone dot image HI with the aid of such a low-pass filter. Consequently, the smoothed halftone dot image SHI (FIG. 4D) includes the original image component and the interference moiré component but devoid of the halftone dot frequency component. The original image component and interference moiré component contained in the smoothed halftone dot image SHI are also smoothed. In view of this, the smoothed object image SOI (FIG. 4C) containing a smoothed original image component and a smoothed interference moiré component is obtained in step S3 in FIG. 3 by smoothing the object image OI in the same manner.

In step S4 in FIG. 3, the interference moiré extractor 24 extracts an interference moiré image (FIG. 4E) from the smoothed object image SOI and the smoothed halftone dot image SHI. Specifically, an interference moiré image IM is obtained by finding the difference between the smoothed halftone dot image SHI and the smoothed object image SOI and multiplying the difference by a coefficient k, where k is an arbitrary number no less than 1. The reason that the difference between the images is multiplied by k is to emphasize the interference moiré image IM and to make this image easier to observe.

The interference moiré image IM is reduced by pixel skipping in step S5, and the reduced interference moiré image IM is outputted in step S6. The interference moiré image IM can be outputted by being displayed on the display device 34, or printed by the printer 200. The pixel skipping in step S5 is intended to reduce the resolution of the interference moiré image IM and the time needed to output the result. When the output time is not a problem, the pixel skipping can be dispensed with, and the high-resolution interference moiré image IM obtained in step S4 can be directly outputted.

The operator can evaluate whether an interference moiré will appear on a print to be reproduced with halftone dots by observing the interference moiré image IM (FIG. 4E) thus obtained.

In step S6, it is possible to output solely the interference moiré image or a synthetic image obtained by superposing the interference moiré image on the object image OI (color image). When such a synthetic image is outputted, conditions should preferably be provided to allow the operator to distinguish between the interference moiré image with greater ease. The following methods can be suggested for outputting interference moiré image.

A first method entails extracting the outline of an object image OI and superposing the interference moiré image IM over this outline. An advantage of this method is that the position of an interference moiré can be observed with ease.

According to a second method, the interference moiré image IM of each color component is reproduced in the corresponding color. For example, the interference moiré images IM of the color components YMCK are reproduced in each of the colors YMCK. Adopting this approach is advantageous in making it easier to identify color components affected by such interference moiré images IM. For example, the interference moiré for the Y (yellow) component tends to be fairly inconspicuous. It can therefore be judged, for example, that there is no need to perform measures aimed at preventing an interference moiré when the Y-component has an interference moiré while the interference moiré of other color components remain fairly inconspicuous.

The first and second methods can be used concurrently. Specifically, interference moiré images for individual color components may be outputted by being superposed over the outlines of the object image OI.

Thus, the present embodiment entails extracting an interference moiré image by smoothing both an object image and a halftone dot image and finding the difference between the smoothed object image and halftone dot image. The interference moiré that will appear during printing can therefore be evaluated based on this interference moiré image.

B. Other Embodiments

Figure 6:
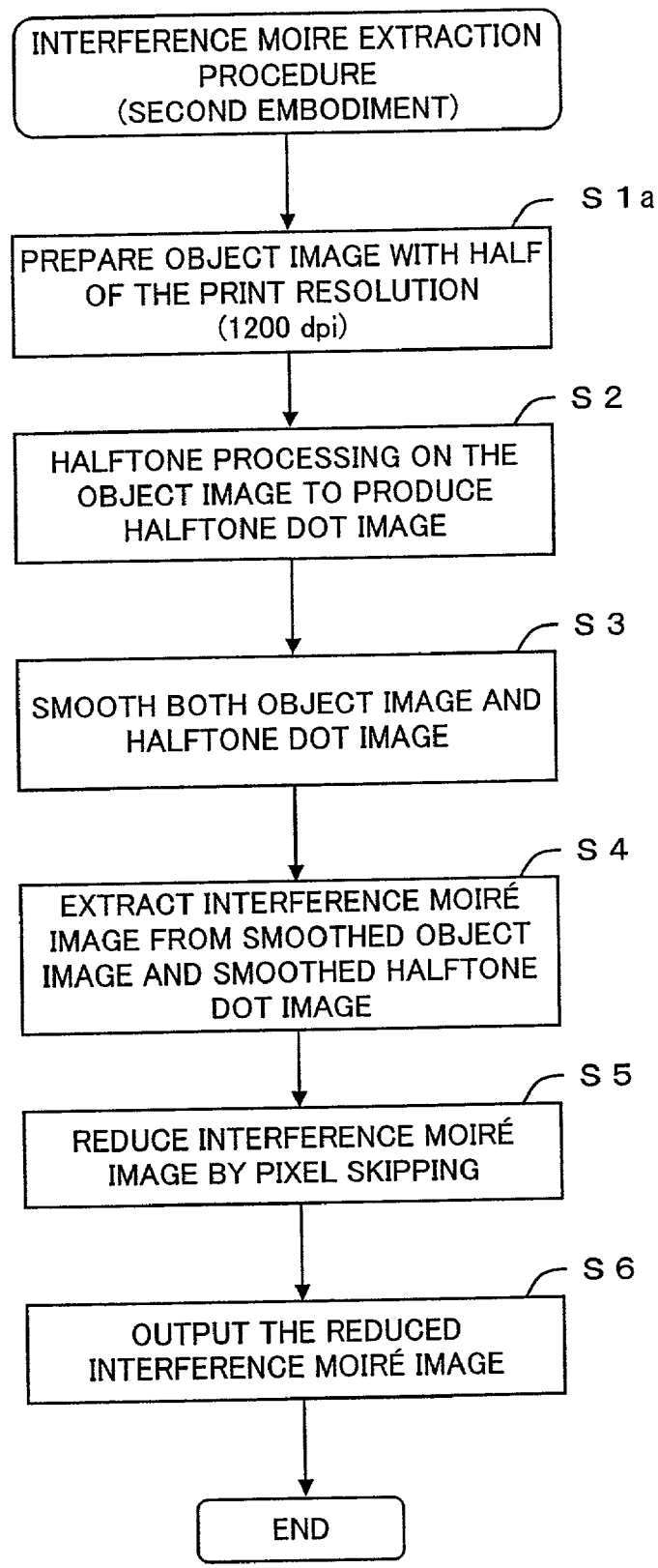
FIG. 6 is a flowchart of the interference moiré extraction routine performed in accordance with a second embodiment.

FIG. 6 is a flowchart of the interference moiré extraction routine performed in accordance with a second embodiment. The fist step S1a is the only difference from the first embodiment shown in FIG. 3. Specifically, an object image whose resolution (1200 dpi) is half the print resolution (2400 dpi) is produced on the basis of the original image to be printed in step S1a in FIG. 6. For example, an object image can be produced by replacing each pixel of the original image with 3×3 pixels if the original image to be printed has a resolution of 400 dpi. The process of step S2 and subsequent processes are the same as in the first embodiment.

This approach is advantageous in that the entire processing time can be reduced by extracting an interference moiré with the aid of an object image whose resolution is less than the print resolution. There is also the possibility that an easily identifiable interference moiré will not be properly extracted when an object image whose resolution is much less than half the print image is used during interference moiré extraction. By contrast, an easily identifiable interference moiré can be extracted by using an object image whose resolution is at least about half the print resolution. Consequently, an object image whose resolution is at least about half the print resolution (but less than the print resolution) is preferably used for the interference moiré extraction in order to reduce the processing time.

Figure 7:
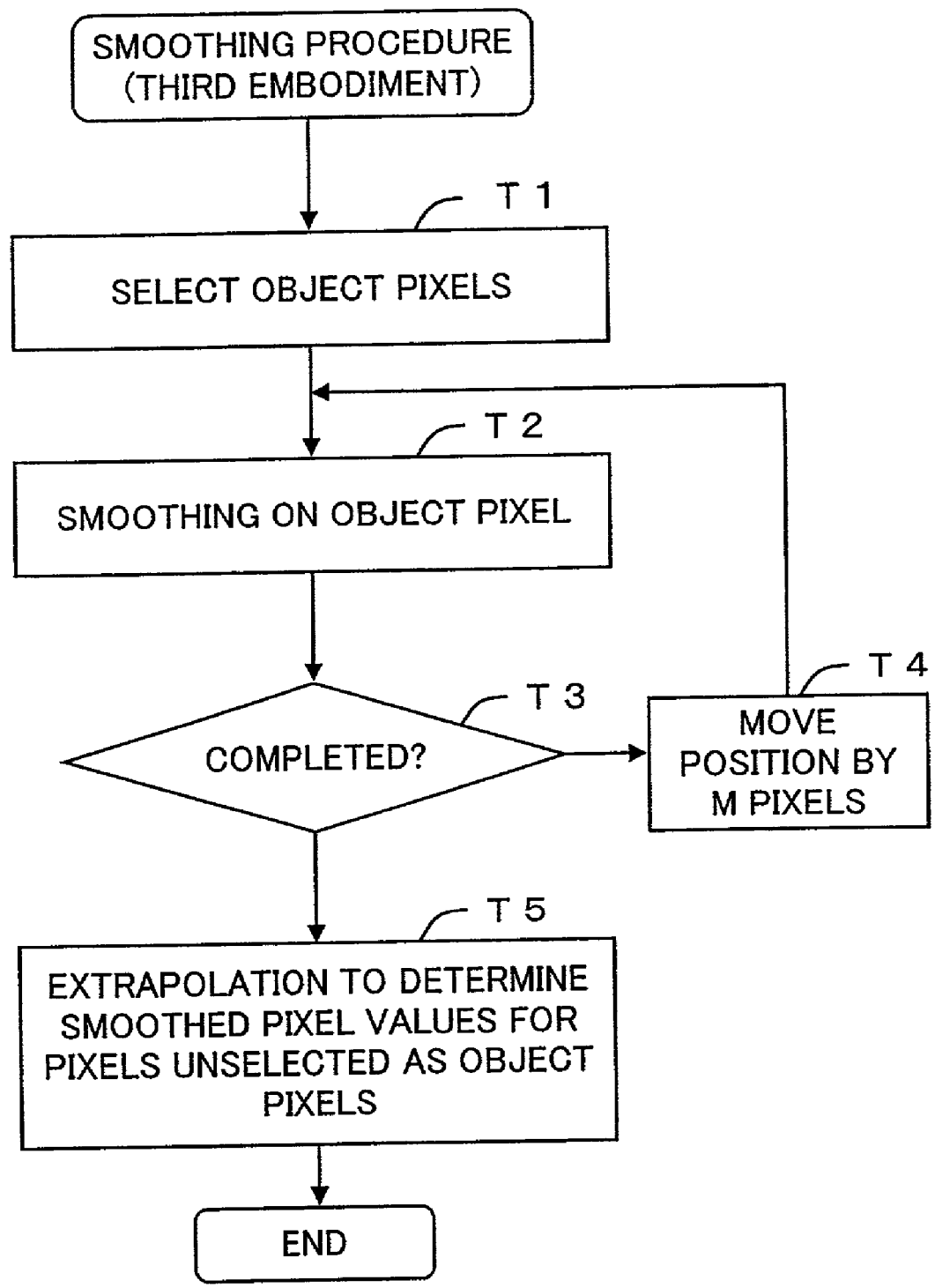
FIG. 7 is a flowchart of a smoothing procedure used according to a third embodiment.

FIG. 7 is a flowchart of a smoothing procedure used according to a third embodiment. In the third embodiment, an interference moiré is extracted in the same manner as in FIG. 3 or FIG. 6, but the specifics of the smoothing procedure in step S3 are different from those employed in the embodiments described above. Although the following description is made for the smoothing of the object image OI, the same applies to the smoothing of the halftone dot image HI.

A single pixel is selected from the object image OI as an object pixel in step T1, and smoothing is performed with the object pixel being assigned to the central pixel of the smoothing filter in step T2. It is determined in step T3 whether the smoothing of the object image OI has been completed, and the operation proceeds to step T4 in the case of a positive outcome.

In step T4, the target of smoothing is moved a distance of M pixels where M is an integer of 2 or greater, and the smoothing of step T2 is then repeated. Specifically, the object pixel is sequentially selected at a rate of one in M pixels, and the selected object pixels are smoothed. The integer M may be set at about 6, for example.

When such smoothing is completed, extrapolation is performed in step T5. The extrapolation allows the pixel values of the pixels not selected as object pixels to be determined by extrapolating the post-smoothing pixel values (smoothed pixel values) of the object pixels. The nearest neighbor technique, bilinear technique, bi-cubic technique, or the like may be used for such extrapolation.

Thus, the smoothing procedure of the third embodiment allows substantially all pixels to be smoothed by: intermittently smoothing at a rate of one in M pixels, and obtaining the smoothed pixel values for the other pixels by extrapolation. The total processing time for the extraction of interference moirés can thus be reduced because fewer smoothing cycles are involved.

The smoothing procedure can be performed using a process other than filtering with a low-pass filter. For example, a smoothing procedure employing a two-dimensional fast Fourier transform (FFT) can be carried out. In a smoothing procedure involving two-dimensional FFT, an object image OI and a halftone dot image HI are first subjected to two-dimensional FFT, the high-frequency component of the two-dimensional FFT coefficient obtained as a result of the transform is then cut off, and two-dimensional reverse FFT is performed as the final step. Smoothed images are obtained as a result.

As used in the present specification, the term "printer" refers to a printer capable of printing designated images on printing paper with or without the use of printing plates, and includes electrophotographic devices, ink-jet devices, and other printers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for evaluating an interference moiré that is likely to be occurred in a halftone dot image when an object image is printed using halftone dots, the method comprising the steps of:

(a) performing halftoning of object image data representing the object image to thereby produce halftone dot image data representing a halftone dot image composed of halftone dots;

(b) smoothing both the object image data and the halftone dot image data to produce smoothed object image data and smoothed halftone dot image data; and (c) obtaining a difference between the smoothed object image data and the smoothed halftone dot image data to produce interference moiré image data representing an interference moiré image.

2. A method as defined in claim 1, wherein the object image data and the halftone dot image data have an identical resolution, which is less than, but at least about half of a print resolution at which the object image is to be printed.

3. A method as defined in claim 1, wherein the step (b) comprises the steps of:
sequentially selecting intermittent pixel positions as an object pixel, and smoothing pixel data with a smoothing filter while assigning the object pixel to a central pixel of the smoothing filter, to thereby produce a smoothed pixel value for each object pixel; and
interpolating the smoothed pixel values for the object pixels with respect to pixels that are not selected as the object pixels, to thereby obtain interpolated smoothed pixel values.

4. A method as defined in claim 1, further comprising the step of:
(d) outputting the interference moiré image in accordance with the interference moiré image data.

5. A method as defined in claim 4, further comprising the step of:
repeating the steps (a) through (c) for each of a plurality of color components corresponding to a plurality of ink colors used in the printing of the object image; and
wherein the step (d) comprises the step of outputting the interference moiré images for the plurality of color components in a mutually distinguishable manner.

6. A method as defined in claim 5, wherein the step (d) comprises the step of outputting the interference moiré images for the plurality of color components in individual colors of the respective color components.

7. An apparatus for evaluating an interference moiré that is likely to be occurred in a halftone dot image when an object image is printed using halftone dots, the apparatus comprising:
a halftone processor configured to perform halftoning of object image data representing the object image to thereby produce halftone dot image data representing a halftone dot image composed of halftone dots;
a smoothing processor configured to smooth both the object image data and the halftone dot image data to produce smoothed object image data and smoothed halftone dot image data; and
a moiré extractor configured to obtain a difference between the smoothed object image data and the smoothed halftone dot image data to produce interference moiré image data representing an interference moiré image.

8. An apparatus as defined in claim 7, wherein the object image data and the halftone dot image data have an identical resolution, which is less than, but at least about half of a print resolution at which the object image is to be printed.

9. An apparatus as defined in claim 7, wherein the smoothing processor comprises:
a smoothing filter configured to sequentially select intermittent pixel positions as an object pixel and to smooth pixel data while assigning the object pixel to a central pixel of the smoothing filter, to thereby produce a smoothed pixel value for each object pixel; and
an interpolator configured to interpolate the smoothed pixel values for the object pixels with respect to pixels that are not selected as the object pixels, to thereby obtain interpolated smoothed pixel values.

10. An apparatus as defined in claim 7, further comprising:
an output device configured to output the interference moiré image in accordance with the interference moiré image data.

11. An apparatus as defined in claim 10, wherein the interference moiré image is produced for each of a plurality of color components corresponding to a plurality of ink colors used in the printing of the object image; and
wherein the output device is configured to output the interference moiré images for the plurality of color components in a mutually distinguishable manner.

12. An apparatus as defined in claim 11, wherein the output device is configured to output the interference moiré images for the plurality of color components in individual colors of the respective color components.

13. A computer program product for evaluating an interference moiré that is likely to be occurred in a halftone dot image when an object image is printed using halftone dots, the computer program product comprising:
a computer readable medium; and
a computer program product stored on the computer readable medium, the computer program comprising:
a first program for causing a computer to perform halftoning of object image data representing the object image to thereby produce halftone dot image data representing a halftone dot image composed of halftone dots;
a second program for causing the computer to smooth both the object image data and the halftone dot image data to produce smoothed object image data and smoothed halftone dot image data; and
a third program for causing the computer to obtain a difference between the smoothed object image data and the smoothed halftone dot image data to produce interference moiré image data representing an interference moiré image.

14. A computer program product as defined in claim 13, wherein the object image data and the halftone dot image data have an identical resolution, which is less than, but at least about half of a print resolution at which the object image is to be printed.

15. A computer program product as defined in claim 13, wherein the second program comprises:
a program for causing the computer to sequentially select intermittent pixel positions as an object pixel and to smooth pixel data while assigning the object pixel to a central pixel of the smoothing filter, to thereby produce a smoothed pixel value for each object pixel; and
a program for causing the computer to interpolate the smoothed pixel values for the object pixels with respect to pixels that are not selected as the object pixels, to thereby obtain interpolated smoothed pixel values.

16. A computer program product as defined in claim 13, further comprising:
an output program for causing the computer to output the interference moiré image in accordance with the interference moiré image data to an output device.

17. A computer program product as defined in claim 16, wherein the interference moiré image is produced for each of a plurality of color components corresponding to a plurality of ink colors used in the printing of the object image; and wherein the output program is configured to output the interference moiré images for the plurality of color components in a mutually distinguishable manner.

18. A computer program product as defined in claim 17, wherein the output program is configured to output the interference moiré images for the plurality of color components in individual colors of the respective color components.

* * * * *